United States Patent
Yan et al.

(10) Patent No.: US 8,737,475 B2
(45) Date of Patent: May 27, 2014

(54) VIDEO SCENE CHANGE DETECTION AND ENCODING COMPLEXITY REDUCTION IN A VIDEO ENCODER SYSTEM HAVING MULTIPLE PROCESSING DEVICES

(75) Inventors: Yong Yan, Austin, TX (US); Erez Steinberg, Tele-Aviv (IL); Yehuda Yitschak, Ramat Yishai (IL)

(73) Assignee: Freescale Semiconductor, Inc., Austin, TX (US)

( * ) Notice: Subject to any disclaimer, the term of this patent is extended or adjusted under 35 U.S.C. 154(b) by 1179 days.

(21) Appl. No.: 12/364,112

(22) Filed: Feb. 2, 2009

(65) Prior Publication Data

US 2010/0195733 A1 Aug. 5, 2010

(51) Int. Cl.
*H04N 7/12* (2006.01)

(52) U.S. Cl.
USPC .................................. 375/240.16

(58) Field of Classification Search
USPC ..................... 375/240.01–240.29
See application file for complete search history.

(56) References Cited

U.S. PATENT DOCUMENTS

| | | | | |
|---|---|---|---|---|
| 5,929,914 A * | 7/1999 | Normand | ............. | 375/240.04 |
| 5,949,490 A * | 9/1999 | Borgwardt et al. | ...... | 375/240.05 |
| 6,731,685 B1 * | 5/2004 | Liu et al. | ................ | 375/240.14 |
| 6,748,019 B1 | 6/2004 | Lin et al. | | |
| 6,963,608 B1 * | 11/2005 | Wu | ............. | 375/240.03 |
| 7,251,275 B2 * | 7/2007 | Wu et al. | ............ | 375/240.03 |
| 8,077,772 B2 * | 12/2011 | Mauchly et al. | ........ | 375/240.01 |
| 2004/0135885 A1 | 7/2004 | Hage | | |
| 2005/0053131 A1 | 3/2005 | Domke et al. | | |
| 2005/0053135 A1 | 3/2005 | Haskell et al. | | |
| 2005/0169371 A1 | 8/2005 | Lee et al. | | |
| 2006/0126728 A1 | 6/2006 | Yu et al. | | |
| 2006/0221086 A1 | 10/2006 | Diard | | |
| 2007/0086528 A1 | 4/2007 | Mauchly et al. | | |
| 2007/0180485 A1 | 8/2007 | Dua | | |

(Continued)

FOREIGN PATENT DOCUMENTS

| | | |
|---|---|---|
| EP | 1850598 | 10/2007 |
| WO | WO2005027526 | 3/2005 |

OTHER PUBLICATIONS

Ringenburg et al. "Global MINMAX Interframe Bit Allocation for Embedded Video Coding." Proceedings of the Data Compression Conference (DCC '04); IEEE Computer Society, 2004. pp. 1-10.

(Continued)

*Primary Examiner* — Gims Philippe
(74) *Attorney, Agent, or Firm* — Terrile, Cannatti, Chambers & Holland, LLP; Michael Rocco Cannatti (57) ABSTRACT

A method of encoding a video frame is disclosed in which video slices of the video frame are initially encoded in parallel using both interframe encoding and intraframe encoding. Then, after a first predetermined minimum amount of the video frame has been encoded, the method includes periodically determining whether the amount of intraframe encoded information for the frame achieves a first threshold, and when the first threshold is achieved, encoding the remainder of the video frame using only intraframe encoding. The method may include determining whether a lower second threshold is achieved based on relative complexity of the frame and quantization. The method may include performing similar comparisons on a slice by slice basis in which any one or more of the processing devices skips motion estimation and interframe encoding for corresponding video slices. A video encoder is disclosed which includes multiple processing devices and a shared memory.

20 Claims, 4 Drawing Sheets

(56) References Cited

U.S. PATENT DOCUMENTS

| | | |
|---|---|---|
| 2007/0189377 A1 | 8/2007 | Taylor et al. |
| 2007/0253491 A1 | 11/2007 | Ito et al. |
| 2008/0046588 A1 | 2/2008 | Deshpande et al. |
| 2008/0137736 A1 | 6/2008 | Richardson et al. |
| 2010/0122044 A1 | 5/2010 | Ford et al. |

OTHER PUBLICATIONS

Li et al. "Adaptive Scene-Detection Algorithm for VBR Video Stream." IEEE Transactions on Multimedia, vol. 6, No. 4, Aug. 2004. pp. 624-633.

Akrivas et al. "Scene Detection Methods for MPEG—Encoded Video Signals." 10th Mediterranean Electrotechnical Conference. MEleCon 2000. vol. II. 0-7803-6290X. pp. 677-680.

Fujii, Tetsurou et al. "A Load Balancing Technique for Video Signal Processing on a Multicomputer Type DSP." NTT Transmission Systems Laboratories, Yokosuka-shi, Kanagawa-ken 238-08 Japan. Downloaded Apr. 8, 2009 from IEEE Xplore. pp. 1981-1984.

Goh, K. et al. "Real Time Full-Duplex H.263 Video Codec System." 1997. IEEE. Downloaded on Apr. 8, 2009 from IEEE. pp. 445-450.

Jung, Bongsoo et al. "Adaptive Slice-Level Parallelism for Real-Time H.264/AVC Encoder with Fast Inter Mode Selection." Department of Electronic and Electrical Engineering, Sungkyunkwan University, 300 Chunchun-Dong, Jangan-Gu, Suwon 440-746, Korea. pp. 1-12.

M. Ribeiro et al., MPEG-4 Natural Video Parallel Implementation on a Cluster, RECPAD 2002—12th Edition of the Portuguese Conference on Pattern Recognition, APRP—The Portuguese Association for Pattern Recognition.

\* cited by examiner

VIDEO SCENE CHANGE DETECTION AND ENCODING COMPLEXITY REDUCTION IN A VIDEO ENCODER SYSTEM HAVING MULTIPLE PROCESSING DEVICES

CROSS-REFERENCE TO RELATED APPLICATIONS

This application is related to U.S. application Ser. No. 12/135,638, filed on Jun. 9, 2008 which is herein incorporated by reference in its entirety for all intents and purposes.

BACKGROUND OF THE INVENTION

1. Field of the Invention

The present invention relates in general to video information processing, and more specifically to detecting scene changes of input video information using a video encoder system with multiple processing devices.

2. Description of the Related Art

Each video frame is subdivided and encoded at a video block (e.g., macroblock or the like). Each video block is encoded in "intraframe" mode in which a prediction video block is formed based on reconstructed video blocks in the current frame, or "interframe" mode in which a prediction video block is formed during motion estimation based on reference video blocks from one or more reference frames. The intraframe encoding mode applies spatial information within the current frame in which the prediction video block is formed from samples in the current frame that have previously encoded, decoded and reconstructed. The interframe encoding mode utilizes temporal information from previous and/or future reference frames to estimate motion to form the prediction video block. The video information is typically partitioned into frames which are further partitioned into slices, in which each video slice incorporates one or more video blocks. The video information is typically processed and transmitted in slices.

Interframe encoding generally provides superior encoding efficiency and is usually performed first. Motion estimation, however, consumes most of the encoding processing time and thus is significantly more expensive in terms of processing resource consumption and computational complexity. During a scene change, or when there is significant motion in a given scene, the video encoder may be significantly stressed in terms of coding complexity, expressed in millions of cycles per second (MCPS). Also, during scene changes or significant motion the standard deviation of MCPS is increased which can significantly depreciate system performance.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes video information processing systems according to exemplary embodiments. It is intended, however, that the present disclosure apply more generally to any of various types of "video information" including video sequences (e.g. MPEG), image information, or image sequencing information, such as, for example, JPEG (Joint Photographic Experts Group), motion JPEG (MJPEG), JPEG2000, motion JPEG2000 (MJPEG2000), etc. The term "video information" as used herein is intended to apply to any video or image or image sequence information.

Figure 1:
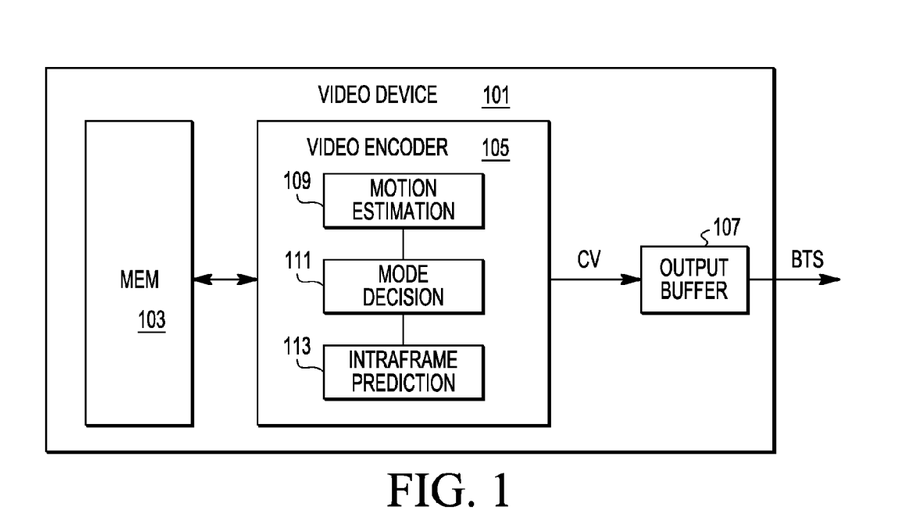
FIG. 1 is a simplified block diagram of a video device implemented according to an exemplary embodiment.

FIG. 1 is a simplified block diagram of a video device 101 implemented according to an exemplary embodiment. The video device 101 includes a memory 103, a video encoder 105, and an output buffer 107 incorporated within a common system unit. The video device 101 may include other logic, circuitry, and/or components that are not shown, such as decoding circuitry, or other input/output (I/O) devices, such as a keyboard, a monitor or display, etc. The memory 103 stores source video information (e.g., video images, video sequences, etc.) which is provided to an input of the video encoder 105. The video encoder 105 encodes source video information and encapsulates encoded video information CV provided to the output buffer 107, which provides an output bitstream (BTS) transmitted via a channel (not shown). The channel may be any media or medium including wireless communications. The video encoder 105 includes encoding components and functions, such as, for example, a motion estimation block 109, an intraframe prediction block 113, and a mode decision block 111. The source video information is partitioned into video frames which are further partitioned into slices, each including one or more macroblocks (MBs). Although the present disclosure refers to macroblocks or MBs, it is understood that the present invention applies to any size video block, including video blocks of size 2×2, 4×4, 2×4, 4×2, 4×8, 8×4, 8×8, 8×16, 16×8, etc. The video encoder 105 encodes each MB in 'intraframe' mode or 'interframe' mode. For the intraframe encoding mode, a prediction MB is formed based on reconstructed MBs in a current frame. The intraframe encoding mode applies spatial information within the current frame in which the prediction MB is formed from samples in the current frame that have previously encoded, decoded and reconstructed. For the interframe encoding mode, a prediction MB is formed based on the MBs of one or more reference frames previously encoded. The interframe encoding mode utilizes temporal information from previous and/or future reference frames to estimate motion to form the prediction MB. The memory 103 may also be used to store reconstructed and reference information during the encoding process.

The motion estimation block 109 determines encoded residuals including a block motion difference for an interframe coding mode. During motion estimation, a block motion difference is determined between a current MB in a current frame and a reference MB in a reference frame. Also during motion estimation, a motion vector (MV) value is determined as a relative distance between positions of the current MB and the reference MB. The intraframe prediction block 113 provides intraframe prediction information (e.g., intraframe prediction MB) based on previously encoded information within the current frame. The mode decision block 111 selects between the interframe prediction and the intraframe prediction information to provide selected prediction information to be encoded. The mode decision block 111 generally determines the encoding mode decision based on maximizing the coding efficiency of the encoded information. As understood by those skilled in the art, interframe encoding removes temporal redundancy determined by motion estimation, whereas intraframe encoding removes spatial redundancy within the same frame as determined by intraframe prediction. As understood by those skilled in the art, the video encoder 105 uses a selected transform function, such as the discrete cosine transform (DCT) algorithm or the like, and provides transform coefficients to a quantization circuit (not shown). The transform coefficients are scaled to integers and quantized into quantized transform coefficients signal by a quantization circuit, where the quantization step size is controlled by a quantization parameter (QP). The quantized transform coefficients scanned and then entropy encoded. The entropy encoded information is provided to the output buffer 107 for transmission via the channel. The relative quality of the encoded information is adjusted via the QP and/or by selection of the entropy coding method to adjust the bitrate of the output bitstream BTS. The QP value may be adjusted by a rate controller (not shown), which estimates the number of bits required to encode an MB or frame. The QP value may be increased to reduce the requisite number of bits.

During a relatively stable scene, the video information usually does not change significantly between any two consecutive frames so that the video information incorporates mostly temporal redundancy. For this reason, interframe encoding generally provides superior encoding efficiency so that motion estimation and interframe prediction is usually performed first. Motion estimation, however, consumes most of the encoding processing time and thus is significantly more expensive in terms of processing resource consumption and computational complexity. Intraframe encoding, on the other hand, requires less computational complexity and processing resources yet generally results in less efficient encoding of the video information. During a scene change, or when there is significant motion in a given scene, motion estimation is performed even if a substantial portion, even up to the entire frame, ends up encoded in intraframe mode. As a result, the video encoder is significantly stressed in terms of coding complexity, expressed in millions of cycles per second (MCPS). Also, during scene changes the standard deviation of MCPS is increased which can significantly depreciate system performance.

The video encoder 105 is configured to identify scene changes and/or a significant level of motion at a relatively early stage of a given video frame and to shut down motion estimation and interframe encoding for that frame. The remainder of the frame is encoded in intraframe mode to significantly reduce computational complexity without depreciating video quality. In one embodiment, the video encoder 105 is further configured to identify a significant level of motion at a relatively early stage of a given slice of a video frame and to shut down motion estimation and interframe encoding for the remainder of that slice. Since significant motion and/or a scene change result in intraframe encoding, elimination of motion estimation and interframe encoding saves otherwise unused processing resources. In this manner, computational complexity is reduced.

Figure 2:
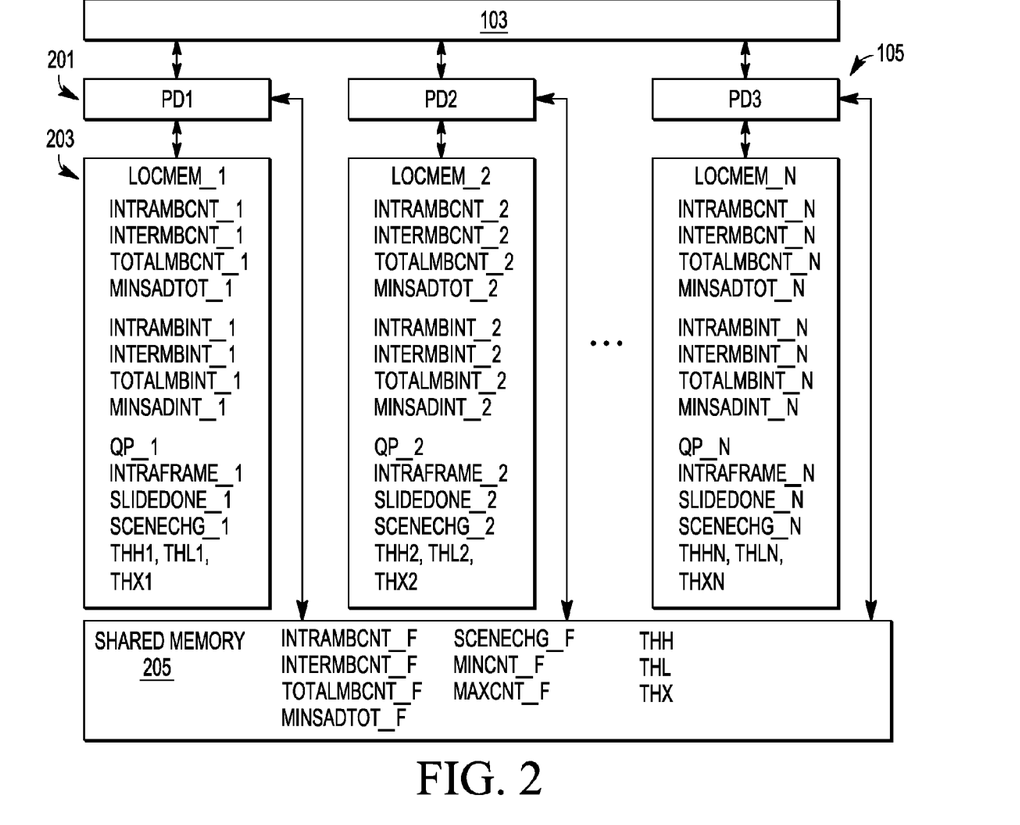
FIG. 2 is a simplified block diagram of the video encoder of FIG. 1 according to one embodiment coupled to the memory of FIG. 1.
Figure 3:
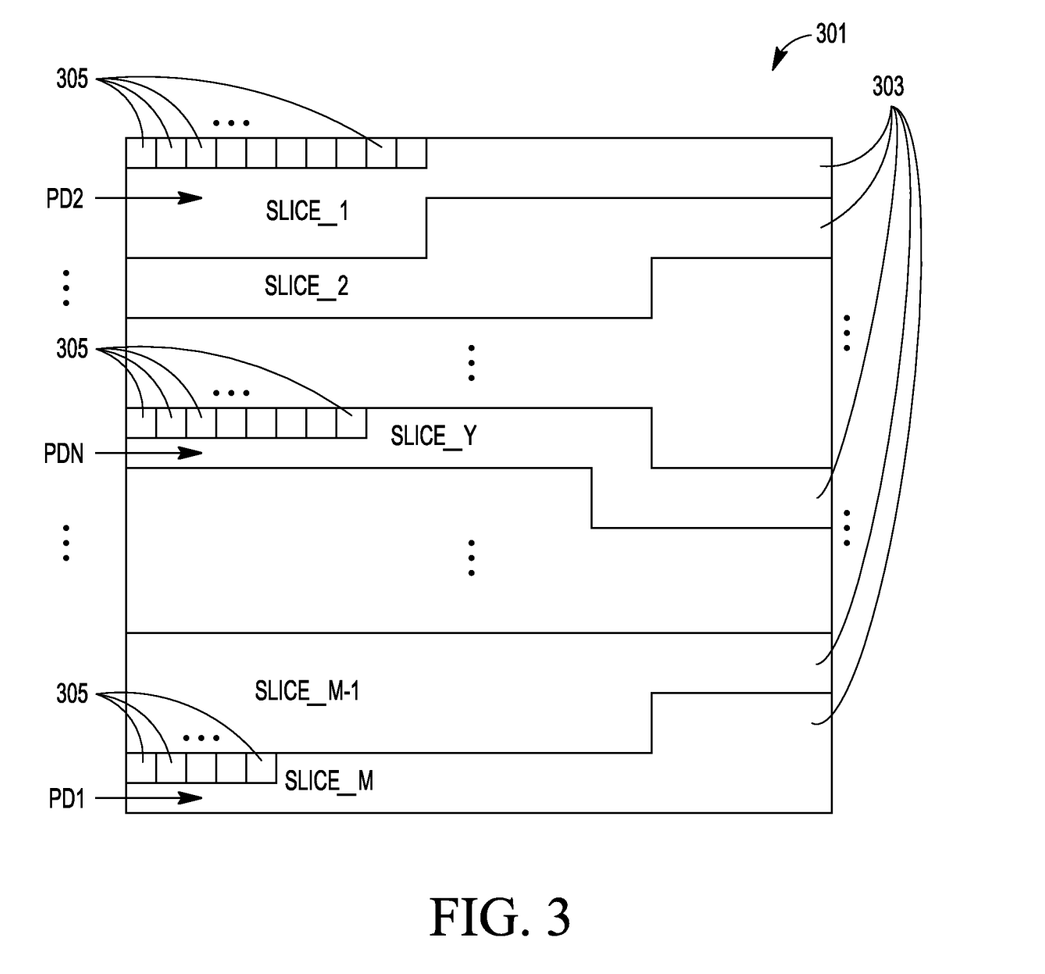
FIG. 3 is a simplified block diagram of an exemplary frame partitioned into a number "M" of slices illustrating slice processing by multiple processing devices.

FIG. 2 is a simplified block diagram of the video encoder 105 according to one embodiment coupled to the memory 103. The video encoder 105 is configured with a number "N" of processing devices (PD) 201, individually labeled PD1, PD2, . . . , PDN in which "N" is any positive integer greater than one. Each of the processing devices 201 is coupled to a corresponding one of N local memory (LOCMEM) devices, individually labeled LOCMEM_1, LOCMEM_2, . . . , LOCMEM_N, in which each local memory device 203 stores local information for the corresponding processing device 201. Furthermore, each of the processing devices 201 is interfaced with a shared memory 205, which stores shared frame variables and or values. Each of the processing devices 201 is configured to perform the functions of the video encoder 105 for a selected portion of the input source video information. The source video information is partitioned into frames and each frame is further partitioned into slices in which each slice includes one or more macroblocks. FIG. 3 is a simplified block diagram of an exemplary frame 301 partitioned into a number "M" of slices 303, individually labeled SLICE_1, SLICE_2, . . . , SLICE_M. Two or more of the processing devices 201 each encodes one or more slices of each frame. As shown, for example, processing device PD1 encodes SLICE_M, processing device PD2 encodes SLICE_1, and so on up to processing device PDN, which encodes an intermediate slice numbered SLICE_Y, in which "Y" is an integer between 1 and M.

It is noted that any given processing device 201 can encode any of the video slices 303 in any order whether arbitrary or according to any suitable selection process such as on a first-come, first-serve (FCFS) basis or the like. In one embodiment, for example, the first processing device 201 to begin processing the next frame acts as a 'master' which partitions the frame into slices and assigns slice processing order for subsequent processing devices to follow. In an alternative embodiment, one of the processing devices 201 is a default master device that partitions each frame into slices and assigns slice ordering. In one embodiment, for example, the slices are prioritized and each processing device completes one slice and advances to the next slice according to a predetermined processing order established by the first processing device or the master device. At least one benefit of using a multiple processing device configuration is that the processing devices 201 operate in parallel so that multiple video slices of each frame are encoded simultaneously. Further, processing may be distributed across each frame to provide a faster and more accurate detection of a scene change in any given frame. The multiple processing devices communicate with each other in any suitable manner, such as via the shared memory 205, so that if and when any processing device detects a scene change, the remaining portion of the frame is encoded using only intraframe encoding by each processing device in which motion estimation and interframe encoding are skipped or otherwise bypassed.

The processing devices 201 begin encoding each frame using both interframe and intraframe encoding modes on a macroblock by macroblock basis. Thus, the first slice processed by a processing device 201 for a given frame is encoded by applying both interframe and intraframe encoding. As shown, each slice 303 is partitioned or subdivided into macroblocks 305 in which the macroblocks 305 of each slice 303 are encoded one at a time in order from top to bottom and from left to right as understood by those skilled in the art. During the encoding process, each processing device 201 tracks, stores and updates local variables within its local memory 203. As each processing device PDi processes macroblocks of a slice, it updates a TOTALMBCNT_i variable within its local memory LOCMEM_i indicating the total number of MBs encoded for that slice, in which "i" is an index representing the particular processing device 201 and its corresponding local memory 203. For example, processing device PD1 updates a TOTALMBCNT_1 variable within its local memory LOCMEM_1 indicating the total number of MBs encoded for the slice it is encoding, such as SLICE_M. Each processing device PDi also updates INTRAMBCNT_i and INTERMBCNT_i variables within its local memory LOCMEM_i, which define the total number of MBs that are intraframe encoded and interframe encoded, respectively, for that slice.

Furthermore, at least during initial frame processing, each processing device PDi performs motion estimation and determines a minimum sum of absolute differences (MINSAD) based on the current macroblock (MB) and a reference MB. To determine each MINSAD value, each pixel value of the reference MB is subtracted from the corresponding pixel of the current MB to determine a difference value, the absolute value is determined of the difference value, and the sum of all of the difference values are added together. In this manner, the MINSAD value is a representation of the difference between the reference MB and the current MB and represents a relative complexity for that given MB. If that MB is selected for interframe encoding, then the new MINSAD value is added to a total MINSAD value MINSADTOT_i for the current slice. Otherwise, if the MB is intraframe encoded, then the MINSAD value for that MB is discarded and not added to the total. Thus, the MINSADTOT_i variable is a total of the MINSAD values of MBs that are interframe encoded for the current slice for each processing device PDi. In summary, MINSAD is a complexity value for a given MB, and MINSADTOT_i is a complexity sum or value for the corresponding slice.

Each processing device 201 further updates corresponding frame variables in the shared memory 205 by adding the values of its corresponding local variables. The frame variables include an INTRAMBCNT_F variable representing the total number of MBs that are intraframe encoded for the frame so far, an INTERMBCNT_F variable representing the total number of MBs that are interframe encoded for the frame so far, a TOTALMBCNT_F variable representing the total number of MBs encoded for the frame so far, and a MINSADTOT_F representing the total of the MINSAD values for all of the MBs that have been interframe encoded for the frame so far. In this manner, MINSADTOT_F represents a total complexity value or sum for a frame so far or an ongoing frame complexity value sum. In one embodiment, each processing device PDi updates both its local memory LOCMEM_i and the shared memory 205 during slice processing. In one embodiment, each processing device PDi uses a semaphore or the like when accessing the shared memory 205 to ensure validity and to prevent conflicts between the processing devices 201 when accessing the shared memory 205. For example, each processing device 201 locks the shared memory 205, updates the shared memory 205 with its local data, and then unlocks the shared memory 205 to enable access by the next processing device 201 attempting to access the shared memory 205. In one embodiment, each processing device 201 may update the shared memory 205 after processing each MB. An update for every MB, however, results in a substantial number of accesses to the shared memory 205 and a high semaphore use frequency thereby potentially reducing overall efficiency. In another embodiment, predetermined interval is established so that each processing device 201 accesses the shared memory 205 on a periodic basis, such as only after completing interval processing. In one embodiment, the predetermined interval is a predetermined number of encoded macroblocks, such as, for example, 10 macroblocks or any other suitable number of MBs. Thus, each processing device 201 only accesses and updates the shared memory 205 only after it has encoded the predetermined number of macroblocks. In an alternative embodiment, the predetermined interval is a period of time.

Each local memory LOCMEM_i further includes interval variables INTRAMBINT_i, INTERMBINT_i, TOTALMBINT_i, and MINSADINT_i, providing the number of intraframe encoded macroblocks, the number of interframe encoded macroblocks, the total number of encoded macroblocks, and the MINSAD total for interframe encoded macroblocks, respectively, during the latest interval for each processing device PDi. Normally, each slice is encoded during multiple intervals. Thus, the interval 'INT' variables in each local memory 203 are the running totals during the latest slice processing interval and the count 'CNT' variables are the running totals for the current slices being encoded for a corresponding processing device 201. During slice processing, each processing device 201 updates its local interval and count variables to maintain the running totals for the latest slice interval and to maintain the running totals for the slice. When each processing device 201 updates the shared memory 205, it adds the values of the interval variables to the corresponding frame variables, and then clears or resets the interval variables for the next interval for the current slice. After slice processing is completed by a given processing device PDi, the slice count variables and the interval variables are cleared or reset for the next slice to be processed until there are no more slices for the processing device PDi. Another local variable SLICEDONE_i is set when encoding by the corresponding processor device PDi is completed for the current slice and is cleared when the processing device PDi moves to the next slice for processing. Each processing device PDi also encodes using a local quantization parameter variable QP_i. Each QP_i is updated by the local processing device PDi or by the rate controller as understood by those skilled in the art. When all slices are completed, processing moves on to the next frame and the encoding proceeds in the same manner until all frames of the input source video information are completed.

In one embodiment, when each processing device PDi accesses the shared memory 205, it also checks a flag SCENECHG_F for the frame. If the SCENECHG_F flag is not set, then the processing device PDi evaluates the frame variables to determine whether a scene change is indicated. If the relative number of intraframe encoded macroblocks has reached or otherwise exceeded a predetermined high threshold THH, then a scene change has been indicated for the frame. It is noted that each threshold described herein is "achieved" when that threshold is reached or otherwise exceeded, and not limited to specific implementations such as being less than, less than or equal to, equal to, greater than or equal to, or greater than the respective threshold. In one embodiment, the processing device PDi determines whether INTRAMBCNT_F/TOTALMBCNT_F>THH (in which a forward slash "/" denotes division), and if so, a scene change is indicated. If a scene change is indicated, the processing device PDi sets the SCENECHG_F flag to inform the other processing devices 201 subsequently accessing the shared memory 205 of a scene change. The processing device PDi also sets a local scene change flag SCENECHG_i, which is a local version of the SCENECHG_F flag. Once the scene change flag is set, the processing device PDi stops performing motion estimation and interframe encoding and instead performs only intraframe prediction and intraframe encoding for the remainder of the frame. As the other processing devices PDi access the shared memory 205, they also check the SCENECHG_F flag and if set, they also stop performing motion estimation and interframe encoding and instead perform only intraframe prediction and intraframe encoding for the remainder of the frame. In this manner, once the SCENECHG_F flag is set, then a scene change is indicated and the remainder of the current frame is intraframe encoded thereby eliminating the processing complexity associated with motion estimation and interframe encoding for the frame.

If the SCENECHG_F flag is not set and if the relative number of intraframe encoded macroblocks has not reached the high threshold THH, then the processing device PDi determines whether the relative number of intraframe encoded macroblocks has reached or otherwise exceed a lower threshold THL. If not, then a scene change is not indicated and processing returns to the current slice. If the lower threshold THL is met, then the processing device PDi further determines a MINSADAVG_F value for the frame and divides it by its corresponding local quantization parameter QP_i and compares the resulting value with another threshold THX. The MINSADAVG_F value is determined by dividing MINSADTOT_F by the total number of interframe encoded macroblocks so far, or INTERMBCNT_F, or MINSADAVG_F=MINSADTOT_F/INTERMBCNT_F. If the lower threshold THL is met and if (MINSADAVG_F/QP_i)>THX, then a scene change is indicated and the processing device PDi sets the SCENECHG_F and SCENECHG_i flags. Again, once the SCENECHG_F flag is set, then a scene change is indicated and the remainder of the current frame is intraframe encoded thereby eliminating the processing complexity associated with motion estimation and interframe encoding for the frame.

In one embodiment, each processing device PDi further evaluates the local variables to determine whether significant motion is occurring for the current slice. In one embodiment, the evaluation and determination is similar to that for the frame level evaluation and determination. First, if INTRAMBCNT_i/TOTALMBCNT_i is greater than a predetermined high threshold, THHi, for the current slice, then significant motion has been detected for the current slice and the processing device PDi sets a corresponding flag INTRAFRAME_i. If THHi is not met, then the processing device PDi further determines whether INTRAMBCNT_i/TOTALMBCNT_i is greater than a lower threshold THLi. If INTRAMBCNT_i/TOTALMBCNT_i is not greater than THLi, then significant motion for the slice is not indicated. However, if INTRAMBCNT_i/TOTALMBCNT_i>THLi, then the processing device PDi further determines whether MINSADAVG_i/QP_i>THXi, in which MINSADAVG_i is equal to the average MINSAD value for the slice so far, or MINSADTOT_i/INTRACNT_i, and THXi is another predetermined threshold for each local processing device PDi. Thus, even if the THHi threshold is not met, if the THLi and THXi thresholds are both met, then the processing device PDi sets the INTRAFRAME_i flag for the current slice indicating significant motion for that slice. It is noted that the intraframe determination is made for each slice only after a predetermined minimum number MINCNT of macroblocks have been encoded for the slice in order to make a more accurate determination.

Once the INTRAFRAME_i flag is set for the current slice, the processing device PDi which is encoding that slice stops performing motion estimation and interframe encoding and instead performs only intraframe prediction and intraframe encoding for the remainder of that slice. In this case, it is noted that one or more of the other processing devices PDi may still be performing motion estimation and interframe encoding for other slices if a scene change has not yet been indicated for the entire frame. In this manner, one or more of the processing devices 201 may terminate motion estimation and interframe encoding processing while the rest of the processing devices 201 continue motion estimation and interframe encoding processing for a given frame. Also, when each the processing device PDi completes a slice and begins the next for the same frame, if a scene change is still not indicated, it begins motion estimation and interframe encoding processing for the next slice until significant motion is detected for that slice or until a scene change is indicated for the entire frame.

Figure 5:
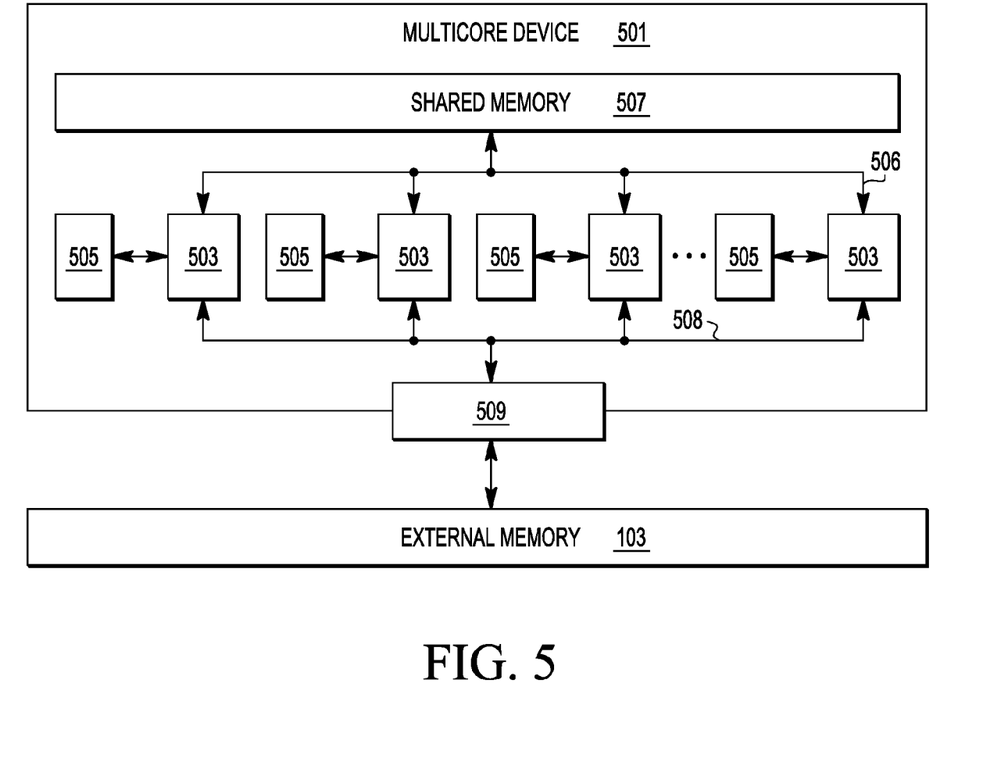
FIG. 5 is a simplified block diagram of the video encoder of FIG. 1 implemented as a multicore chip or device coupled to an external memory.

It is noted that the processing devices 201 and corresponding local memories 203 may be implemented in any one of several different manners. In one embodiment, the processing devices 201 are separate computers or computing devices with local memories which communicate via a shared memory device, such as a shared random-access memory (RAM) or other programmable memory or the like. In another embodiment, the processing devices 201 are separate processors or microprocessors located on the same printed circuit board (PCB) or different PCBs communicatively interfaced together depending upon the particular implementation. In another embodiment as shown in FIG. 5, for example, the processing devices PDi are shown as separate processing cores 503 located in a multicore integrated circuit (IC) or device 501, where each processing core 503 is interfaced with a local memory 505. A shared memory 507 is also shown located on the same multicore device 501 and interfaced with each of the processing cores 503 via an appropriate memory bus 506 or the like, although the shared memory 507 may also be implemented as an external memory. External memories are externally accessed via an external interface on the chip. In one embodiment, the memory 103 is a relatively large memory for storing all or a significant portion of source video information and thus is usually an external memory for a core processor embodiment. As shown in FIG. 5, for example, the multicore device 501 includes a communication I/O interface 509 internally coupled to each of the processing cores 505 via a corresponding bus 508 or the like, and the memory 103 is externally coupled to the muticore chip 501 via the interface 509.

Figure 4:
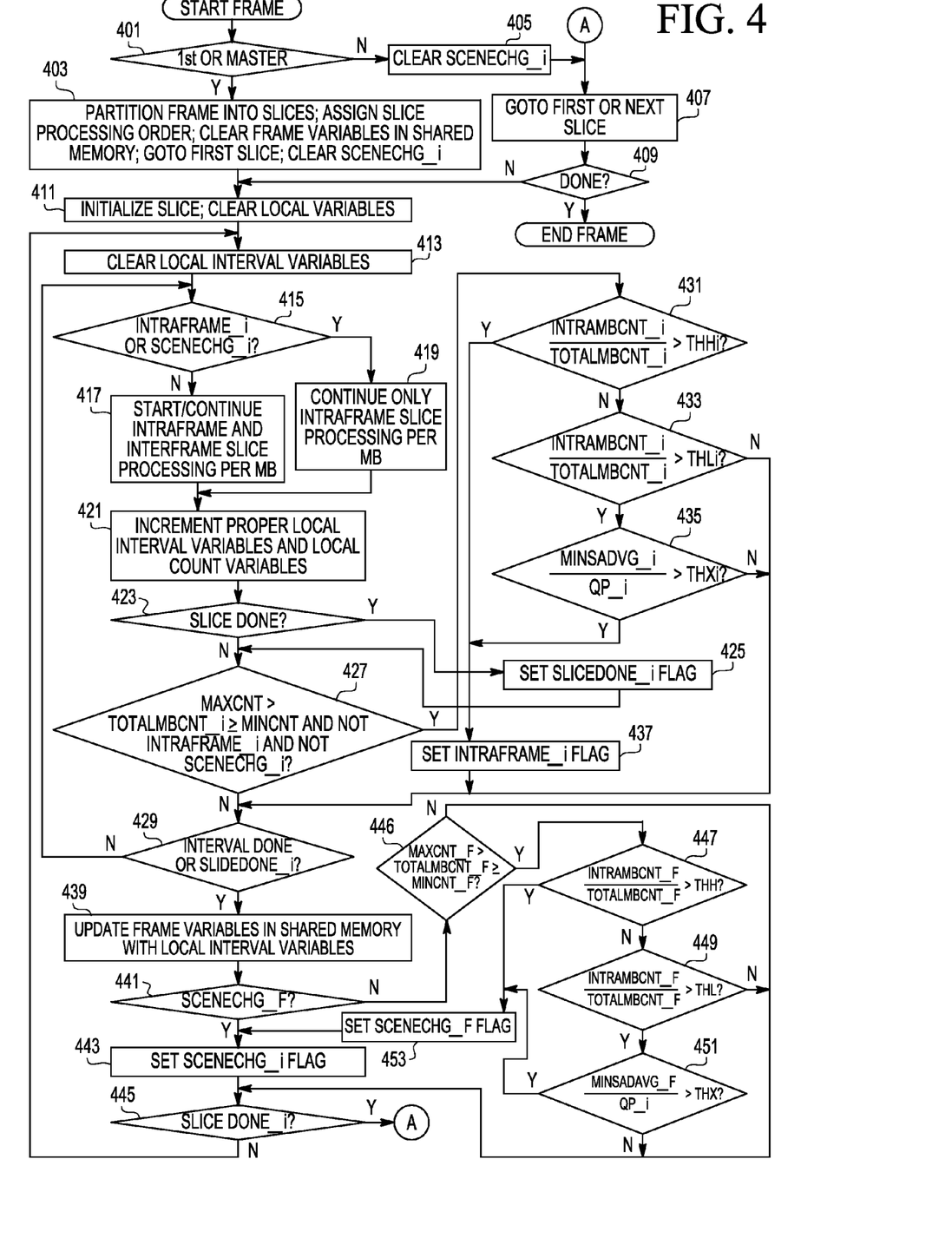
FIG. 4 is a flowchart diagram illustrating operation for each of the processing devices of FIG. 2 according to one embodiment for encoding each slice of each frame of the source video information.

FIG. 4 is a flowchart diagram illustrating operation for each of the processing devices PDi according to one embodiment for encoding each slice of each frame of the source video information. Operation begins at an initial block 401 to query whether the processing device PDi is the first processing device or otherwise is a "master" device available to begin processing the next frame. In one embodiment, one of the processing devices PDi is designated as the master to initialize each frame for encoding. In another embodiment, the first processing device PDi available to begin processing the next frame performs the initialization for the frame. If the current processing devices PDi is the master or is the first device for the frame, operation proceeds to block 403 to initialize the first or next frame for encoding. During block 403, the frame is partitioned into multiple slices (e.g., M slices as shown in FIG. 3) and a slice processing order is established. In one embodiment, the slices may be ordered and processed in order from top to bottom of the frame. Alternatively, the slices are processed in any suitable order to more quickly identify a scene change for the multiple processing devices 201. For example, if there are three processing devices 201, the first slice is located at or near the top of the frame, the second slice is located near the middle of the frame, and the third slice is located at or near the bottom of the frame so that the three processing devices are more quickly able to make a scene change determination across the frame. Thus, slice processing order may be distributed across the frame in this fashion. In another embodiment, each of the processing devices PDi are pre-assigned particular slices in a particular order.

During block 403, the frame variables in the shared memory 205 are cleared or otherwise reset. As shown in FIG. 2, for example the frame count variables INTRAMBCNT_F, INTERMBCNT_F, TOTALMBCNT_F, MINSADTOT_F, and SCENECHG_F are all reset or cleared. The thresholds THH, THL and THX may be constant values that are not changed or may be variables that are adjusted during processing. In one embodiment, the thresholds THH, THL and THX are constants that are not changed, and may be hardcoded rather than stored in memory. The processing device PDi performing block 403 then proceeds to the first slice to be encoded for the frame, such as accessing a corresponding pointer or memory address of the first MB of the slice. The processing device PDi performing block 403 also clears its local SCENECHG_i flag to ensure that it is cleared in the event it was set in the last frame. If set during processing of the current frame, the local SCENECHG_i flag is not cleared until the next frame. Then operation proceeds to next block 411 in which the first slice is initialized for processing and the local variables for the processing device 201 are reset or cleared. In this case the local count or CNT variables are cleared including INTRAMBCNT_i, INTERMBCNT_i, TOTALMBCNT_i, and MINSADTOT_i, and the local interval or INT variables are cleared including INTRAMBINT_i, INTERMBINT_i, TOTALMBINT_i, and MINSADINT_i. The QP_i parameter may or may not be adjusted, reset or cleared depending upon the particular configuration. In one embodiment, the QP_i values are adjusted by the rate controller or under control of the rate controller. The INTRAFRAME_i and SLICEDONE_i flags are also cleared, although the SCENECHG_i flag is not cleared since once set during any given slice, it remains set until the next frame.

Referring back to block 401, every subsequent access by the same or different processing devices PDi for the same frame proceed to block 405 (instead of block 403) in which the local SCENECHG_i flag is cleared to begin processing for the current frame. Operation advances to block 407 in which the processing device PDi advances to the first or next slice to be processed. The next slice is either according to predetermined slice processing order or is the next slice pre-assigned for that processing device PDi. It is noted that in the event a master processing device is designated which has not yet initialized the frame at block 403, operation remains at block 407 until block 403 is performed. Operation then advances to block 409 to determine whether processing is done for the processing device PDi for the current frame. If there are no more slices to process, or if the processing device PDi has completed its assigned slices, then operation for that processing device PDi is completed. Otherwise, operation proceeds to block 411 to initialize the next slice and to clear the local variables as previously described.

Operation then proceeds from block 411 to block 413 in which the local interval variables INTRAMBINT_i, INTERMBINT_i, TOTALMBINT_i, and MINSADINT_i are cleared. It is noted that although these variables were previously cleared at block 411, block 413 is part of another processing loop which ensures these interval variables are cleared before further processing. At next block 415, the INTRAFRAME_i and SCENECHG_i flags are both checked to determine whether motion estimation and interframe encoding are to be skipped. If neither flag is set, then operation proceeds to block 417 in which intraframe prediction and encoding and motion estimation and interframe encoding for the slice are performed for the next MB. If either flag is set, operation proceeds instead to block 419 in which motion estimation and interframe encoding are not performed and instead only intraframe prediction and encoding are performed for the next MB. After either block 417 and 419, operation proceeds to block 421 in which the local interval and count variables are incremented. In particular, TOTALMBINT_i and TOTALMBCNT_i are both incremented. If the MB was intraframe encoded, then INTRAMBINT_i and INTRAMBCNT_i are both incremented whereas INTERMBINT_i and INTERMBCNT_i are not. If instead the MB was interframe encoded, then INTERMBINT_i and INTERMBCNT_i are both incremented whereas INTRAMBINT_i and INTRAMBCNT_i are not. Also, if the MB was interframe encoded, then the MINSAD determined during motion estimation is added to both MINSADINT_i and MINSADCNT_i.

Operation then proceeds to block 423 in which it is queried whether the last MB of the current slice has been encoded. If so, operation proceeds to block 425 in which the SLICEDONE_i flag is set. If the slice is not done, or after setting the SLICEDONE_i flag block 425, operation proceeds to block 427 to query whether to test the current slice for a large level of motion. In one embodiment, each slice is tested to determine whether to terminate motion estimation and interframe encoding for the remainder of the slice. In an alternative embodiment, each slice is not tested so that block 427 is skipped or otherwise not performed. If the motion for the slice is to be tested, it is queried at block 427 whether TOTALMBCNT_i is greater than or equal to a variable MINCNT or less than another variable MAXCNT, and it is further queried whether either of the flags INTRAFRAME_i and SCENECHG_i are set. The variable MINCNT represents a minimum number of MBs that should be processed and encoded before determining whether to test the slice for significant motion. While it is desired to make this test as soon as possible, it is also desired to collect a sufficient amount of information for the slice in order to make a more accurate motion determination. The variable MAXCNT represents a maximum number of MBs such that if the test is not met by MAXCNT MBs in the given slice, there is likely less motion so that testing is competed for the slice. Also, if the INTRAFRAME_i flag is already set, then there is no need for this test since interframe processing is already terminated for the slice or for the frame. If MINCNT is not yet reached, or if MAXCNT is reached, or if either of the flags at block 427 are set, then operation proceeds to block 429 in which it is determined whether the current slice interval is completed or whether the SLICEDONE_i flag is set. If the SLICEDONE_i flag is set, then the shared memory 205 is updated with the last set of information for the slice.

Each slice interval is either a minimum number of macroblocks to be encoded, or is a predetermined minimum time interval before updating the shared memory 205. In one embodiment, if the interval is defined as a minimum time interval, then a timer or the like (not shown) is initiated during slice processing and checked after each MB is encoded and then reset when the condition is met and checked. Whenever time is expired, the shared memory 205 is updated. In another embodiment, if the interval is defined as a minimum number of macroblocks to be encoded, then the TOTALINT_i value is compared with an INTERVAL value or the like for each slice interval. In a specific exemplary embodiment, for example, INTERVAL is 10 MB so that the shared memory 205 is updated after 10 MBs are encoded for each slice. If the interval or the slice is not yet completed, operation returns to block 415 to continue slice processing. Operation loops between blocks 415 and 429 until the slice interval or slice processing is completed.

Referring back to block 427, if it is desired to motion test each slice, if MINCNT has been met, if MAXCNT has not been reaches, and if neither of the INTRAFRAME_i and SCENECHG_i flags have been set, then operation proceeds instead to block 431 in which it is queried whether INTRAMBCNT_i/TOTALMBCNT_i>THHi. As previously noted, THHi is a higher threshold such that if a higher percentage of MBs are intraframe encoded, then this condition is met. If the THHi threshold is not yet achieved, then operation proceeds to block 433 to test whether INTRAMBCNT_i/TOTALMBCNT_i>THLi. As previously noted, THLi is a lower threshold. If the THHi threshold has not been met but the THLi threshold has, then operation proceeds to block 435 to test whether MINSADAVG_i/QP_i>THXi. The MINSADAVG_i value is determined by dividing MINSADTOT_by the total number of interframe encoded macroblocks so far for the slice, or INTERMBCNT_i, such that MINSADAVG_i=MINSADTOT_i/INTERMBCNT_i. In this manner, MINSADTOT_i is an average complexity value or sum of interframe encoded information for the respective slice. If the THLi threshold is not met at block 433, or if the THLi threshold is met but the THXi threshold is not met at block 435, then operation proceeds to block 429. Otherwise, if the THHi threshold is met, or if the THLi and THXi thresholds are both met, then operation proceeds instead to block 437 in which the INTRAFRAME_i flag is set and then operation proceeds to block 429. If the INTRAFRAME_i flag is set, then the remainder of the slice is processed only by intraframe prediction and intraframe encoding whereas motion estimation and interframe encoding are skipped.

Referring back to block 429, whenever the current interval or the current slice has been completed, operation proceeds to block 439 in which the frame variables INTRAMBCNT_F, INTERMBCNT_F, TOTALMBCNT_F and MINSADTOT_F in the shared memory 205 are updated with the local interval variables INTRAMBINT_i, INTERMBINT_i, TOTALMBINT_i and MINSADINT_i, respectively. In this manner, as each of the processing devices PDi access and update the frame variables in the local memory 205 to track the encoding progress of the entire frame. At next block 441, it is queried whether the SCENECHG_F flag has been set. If the SCENECHG_F flag is set (such as by any of the processing devices PDi in an earlier shared memory access iteration), then a scene change has been detected for the current frame and operation proceeds to block 443 in which the local version scene change flag SCENECHG_i is set. Then operation proceeds to block 445 to check whether the SLICEDONE_i flag is set. If the SLICEDONE_i flag is set, then operation proceeds to block 407 to begin processing the next slice. Otherwise, if the SLICEDONE_i flag is set as determined at block 445, then operation returns to block 413 in which the local interval variables are cleared for continued processing of the current slice. It is noted that although the slice interval INT variables are cleared, the slice count CNT variables maintain a running total for the current slice until the slice is encoded.

Referring back to block 441, if the SCENECHG_F flag is not set, then operation proceeds to block 446 to determine whether MINCNT_F≥TOTALMBCNT_F≥MINCNT_F. MINCNT_F is a predetermined minimum number of encoded macroblocks for the frame which is similar to MINCNT for the slice, in that the intraframe determination is made for each frame only after MINCNT_F macroblocks have been encoded for the frame in order to make a more accurate determination. MAXCNT_F is a predetermined maximum number of macroblocks such that when MAXCNT_F is reached, it is assumed that there is no scene change for the present frame so that checking is stopped. In one embodiment, both MINCNT_F and MAXCNT_F are stored in the shared memory 205. If MINCNT_F is not reached or if MAXCNT_F is reached, then operation returns back to block 445 to query whether the current slice is completed as previously described. If MINCNT_F is reached but MAXCNT_F is not, then operation proceeds to block 447 to begin determining whether a scene change has occurred as determined by the frame variables stored in the shared memory 205. At block 447, it is queried whether INTRAMBCNT_F/TOTALMBCNT_F>THH. As previously noted, THH is a higher threshold such that if a higher percentage of MBs are intraframe encoded for the frame, then this condition is met. If the THH threshold is not yet achieved, then operation proceeds to block 449 to test whether INTRAMBCNT_F/TOTALMBCNT_F>THL. As previously noted, THL is a lower threshold. If the THH threshold has not been met but the THL threshold has, then operation proceeds to block 451 to test whether MINSADAVG_F/QP_i>THX. The MINSADAVG_F value is the average MINSAD value for interframe encoded MBs for the frame so far as previously described. In this manner, MINSADTOT_F is an average complexity value or sum of interframe encoded information for the frame so far. If the THL threshold is not met at block 449, or if the THL threshold is met but the THX threshold is not met at block 451, then operation proceeds back to block 445 to query whether the current slice is done. Otherwise, if the THH threshold is met, or if the THL and THX thresholds are both met, then operation proceeds instead to block 453 in which the SCENECHG_F flag is set indicating a scene change for the frame. After block 453, operation proceeds to block 443 to set the corresponding local SCENECHG_i flag, and then operation proceeds to block 445 to determine whether the current slice is done as previously described. Once the SCENECHG_F flag is set during frame processing, then the remainder of the frame is processed only by intraframe prediction and intraframe encoding whereas motion estimation and interframe encoding are skipped.

In one embodiment the threshold THH is ¾ so that if 75% of the encoded MBs so far for a given frame are intraframe encoded after at least one slice interval, then a scene change is detected. In one embodiment, the threshold THL is ½ so that if 50% of the encoded MBs so far for a given frame are intraframe encoded after at least one slice interval, then another test is performed in which the MINSADAVG value divided by QP_i is compared with another threshold THX. THX is set to whatever value distinguishes a scene change from large motion and may be empirically determined. In one embodiment, each of the thresholds THHi may be equal to each other (one threshold for all slice tests), and it may be hardcoded rather than stored. Also, each of the thresholds THLi may be equal to each other (one threshold for all slice tests), and it may be hardcoded rather than stored. Likewise, each of the thresholds THXi may be equal to each other (one threshold for all slice tests), and it may be hardcoded rather than stored. Further, the thresholds THHi may be equal to THH. In one embodiment, however, it may be desired to relax the threshold at the slice level so that THHi is made less than THH. Of course, THHi may be made greater than THH. Similarly, the thresholds THLi may be equal to THL, or it may be desired to relax the threshold at the slice level so that THLi is made less than THL. Of course, THLi may also be made greater than THL. Likewise, the thresholds THXi may be equal to THX, or it may be desired to relax the threshold at the slice level so that the thresholds THLi are made less than THL. Of course, THXi may also be made greater than THX.

A method of encoding a video frame according to one embodiment includes initially encoding video slices of the video frame in parallel using both interframe encoding and intraframe encoding, after a first predetermined minimum amount of the video frame has been encoded, periodically determining whether the amount of intraframe encoded information for the frame achieves a first threshold, and if the first threshold is achieved, encoding the remainder of the video frame using only intraframe encoding.

The method may include determining an average complexity of interframe encoded information for the video frame during encoding, periodically determining whether the amount of intraframe encoded information for the video frame achieves a second threshold which is less than the first threshold after the first predetermined minimum amount of the video frame has been encoded, determining whether the average complexity of interframe encoded information for the video frame divided by a quantization parameter achieves a third threshold if the second threshold is achieved, and encoding the remainder of the video frame using only intraframe encoding if the second and third thresholds are both achieved.

The method may include, for each video slice, periodically determining whether the amount of intraframe encoded information for the video slice achieves a second threshold after a second predetermined minimum amount of the video slice has been encoded, and encoding the remainder of the video slice using only intraframe encoding if the second threshold is achieved. The method may further include determining an average complexity of interframe encoded information for the video slice during encoding, periodically determining whether the amount of intraframe encoded information for the video slice achieves a third threshold which is less than the second threshold after the second predetermined minimum amount of the video slice has been encoded, determining whether the average complexity of interframe encoded information for the video slice divided by a quantization parameter achieves a fourth threshold if the third threshold is achieved, and encoding the remainder of the video slice using only intraframe encoding if the third and fourth thresholds are both achieved.

A video encoder according to one embodiment includes multiple processing devices and a shared memory. The processing devices are configured to perform motion estimation and interframe encoding and to perform intraframe prediction and intraframe encoding for video blocks of video information, in which each frame is partitioned into multiple slices and in which each slice includes one or more video blocks. The shared memory stores a first variable which is a total number of encoded video blocks for each frame and a second variable which is a total number of intraframe encoded video blocks for a given frame. For each frame, at least two of the processing devices begin encoding slices by performing both motion estimation and intraframe prediction for interframe encoding and intraframe encoding. Each processing device periodically updates the first and second variables, and when at least a first predetermined minimum number of video blocks has been encoded for a frame, the device further detects a scene change if the second variable divided by the first variable reaches a first predetermined threshold. If a scene change is detected for a frame, remaining video blocks of the frame are encoded using only by intraframe encoding.

The shared memory may further store a third variable which is a total number of interframe encoded video blocks for a frame and a fourth variable comprising a total complexity value for the frame. In this case, each processing device periodically updates the third and fourth variables, and when the first predetermined minimum number of video blocks has been encoded for the frame, the device further detects a scene change for the frame if the second variable divided by the first variable reaches a second predetermined threshold which is less than the first predetermined threshold and if the fourth variable divided by the third variable and further divided by a quantization parameter reaches a third predetermined threshold.

The video encoder may further include local memories, each for a corresponding processing device, and each storing corresponding quantization parameters for slices being encoded by the processing devices. Each local memory stores corresponding encoding variables for each slice. Each processing device may determine a significant amount of motion for a slice in a similar manner as a scene change is determined for the frame. In particular, if the slice has a high threshold of intraframe encoding, or if the slice has a lower threshold of intraframe encoding and if the average complexity of the slice divided by a corresponding quantization parameter achieves another threshold, then the slice is considered to have significant motion. Whenever significant motion is detected for a slice, the processing device encoding that slice encodes the remainder of the slice using only intraframe encoding while motion estimation and interframe encoding are skipped or otherwise bypassed.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Also, although the present invention has been described herein with respect to video information, it is appreciated that the present invention applies more generally to any "image information", such as video (e.g. MPEG and the like), and image, or image sequencing, such as, for example, JPEG, MJPEG, JPEG2000, MJPEG2000, etc. The term "image information" as used herein is intended to apply to any video or image or image sequence information. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:
1. A method of encoding a video frame, comprising:
initially encoding a plurality of video slices of the video frame in parallel using both interframe encoding and intraframe encoding;
during said encoding, determining an amount of intraframe encoded information relative to a total amount of encoded information of the video frame;
after a first predetermined minimum amount of the video frame that is sufficient to detect a scene change has been encoded, periodically determining whether the amount of intraframe encoded information for the video frame achieves a first threshold;

wherein the first threshold comprises a predetermined ratio of intraframe encoded information divided by total encoded information of the video frame; and when the first threshold is achieved, encoding the remainder of the video frame using only intraframe encoding.

2. The method of claim 1, further comprising:

during said encoding, determining an average complexity of interframe encoded information for the video frame;

after the first predetermined minimum amount of the video frame has been encoded, periodically determining whether the amount of intraframe encoded information for the video frame achieves a second threshold which is less than the first threshold;

when the second threshold is achieved, determining whether the average complexity of interframe encoded information for the video frame divided by a quantization parameter achieves a third threshold; and when the second and third thresholds are both achieved, encoding the remainder of the video frame using only intraframe encoding.

3. The method of claim 1, further comprising:

for each video slice, after a second predetermined minimum amount of the video slice has been encoded, periodically determining whether the amount of intraframe encoded information for the video slice achieves a second threshold; and when the second threshold is achieved, encoding the remainder of the video slice using only intraframe encoding.

4. The method of claim 3, further comprising:

during said encoding, determining an average complexity of interframe encoded information for the video slice;

after the second predetermined minimum amount of the video slice has been encoded, periodically determining whether the amount of intraframe encoded information for the video slice achieves a third threshold which is less than the second threshold;

when the third threshold is achieved, determining whether the average complexity of interframe encoded information for the video slice divided by a quantization parameter achieves a fourth threshold; and when the third and fourth thresholds are both achieved, encoding the remainder of the video slice using only intraframe encoding.

5. A method of reducing encoding complexity while encoding video information, comprising:

partitioning the video information into a plurality of frames and partitioning each frame into a plurality of slices in which each slice comprises at least one video block;

simultaneously encoding at least two of the plurality of slices at a time for each of the plurality of frames, wherein said encoding for each frame starts with performing motion estimation and intraframe prediction and selecting between interframe encoding and intraframe encoding for each video block of each slice being encoded;

during said encoding of a frame, tracking a total number of encoded video blocks for the frame and tracking a number of video blocks that are intraframe encoded for the frame;

after encoding at least a first predetermined minimum number of video blocks of a frame, detecting a scene change for the frame when a number of video blocks that are intraframe encoded for the frame divided by the total number of encoded video blocks for the frame achieves a first predetermined threshold; and when a scene change is detected, encoding remaining video blocks of the frame by performing only intraframe encoding and by skipping motion estimation and interframe encoding.

6. The method of claim 5, further comprising:

determining an average complexity value for each frame during interframe encoding; and wherein said detecting a scene change for the frame further comprises detecting a scene change for the frame when the number of video blocks that are intraframe encoded for the frame divided by the total number of encoded video blocks for the frame achieves a second predetermined threshold which is less than the first predetermined threshold and when the average complexity value for the frame divided by a quantization parameter achieves a third predetermined threshold.

7. The method of claim 6, wherein said determining an average complexity value for each frame comprises:

determining a complexity value for each video block in which motion estimation is performed for a frame;

tracking a number of video blocks that are interframe encoded for the frame;

summing complexity values for each of a plurality of video blocks which are interframe encoded for the frame and providing a total complexity sum for the frame; and dividing the total complexity sum by the number of video blocks that are interframe encoded for the frame.

8. The method of claim 7, wherein said determining a complexity value for each video block in which motion estimation is performed for a frame comprises determining a minimum sum of absolute differences between the video block being encoded and a reference video block.

9. The method of claim 5, further comprising:

determining a total number of encoded video blocks for each slice and determining a number of video blocks that are intraframe encoded for each slice; and after at least a second predetermined minimum number of video blocks of a slice are encoded, detecting significant motion for the slice when the number of video blocks that are intraframe encoded for the slice divided by the total number of encoded video blocks for the slice achieves a second predetermined threshold; and when significant motion is detected for a slice, encoding remaining video blocks of the slice by performing only intraframe encoding and by skipping motion estimation and interframe encoding for the slice.

10. The method of claim 9, further comprising:

determining an average complexity value for each slice during interframe encoding; and wherein said detecting significant motion for the slice further comprises detecting significant motion for the slice when the number of video blocks that are intraframe encoded for the slice divided by the total number of encoded video blocks for the slice achieves a third predetermined threshold which is less than the second predetermined threshold and when the average complexity value for the slice divided by a quantization parameter achieves a fourth predetermined threshold.

11. The method of claim 10, wherein said determining an average complexity value for each slice comprises:

determining a complexity value for each video block in which motion estimation is performed for a slice;

tracking a number of video blocks that are interframe encoded for the slice;

summing complexity values for each of a plurality of video blocks which are interframe encoded for the slice and providing a total complexity sum for the slice; and dividing the total complexity sum by the number of video blocks that are interframe encoded for the slice.

12. The method of claim 5, further comprising:
determining a number of video blocks that are intraframe encoded for a slice, determining a number of video blocks that are interframe encoded for the slice, and determining a total number of encoded video blocks for the slice; and
after each of a predetermined interval, adding the number of video blocks that are intraframe encoded for the slice to a total number of video blocks that are intraframe encoded for a corresponding frame, adding the number of video blocks that are interframe encoded for the slice to a total number of video blocks that interframe encoded for the corresponding frame, and adding the total number of encoded video blocks for the slice to the total number of encoded video blocks for the corresponding frame.

13. The method of claim 12, further comprising:
determining a complexity value for each video block that is interframe encoded for the slice;
summing complexity values of those video blocks of the slice which are interframe encoded to provide a slice complexity value sum; and
after each of the predetermined interval, adding the slice complexity value sum to a frame complexity value sum.

14. A video encoder, comprising:
a plurality of processing devices, each for encoding video blocks of a plurality of video frames, wherein each processing device is configured to perform motion estimation and interframe encoding and to perform intraframe prediction and intraframe encoding, wherein each of said plurality of frames are partitioned into a plurality of slices in which each slice comprises at least one video block;
a shared memory which stores a first variable comprising a total number of encoded video blocks for each frame and a second variable comprising a total number of intraframe encoded video blocks for said each frame;
wherein for said each frame, at least two of said plurality of processing devices begin encoding at least two of said plurality of slices of said each frame by performing both motion estimation and intraframe prediction for interframe encoding and intraframe encoding;
wherein each of said at least two of said plurality of processing devices periodically updates said first and second variables, and when at least a first predetermined minimum number of video blocks is encoded for said each frame, further detects a scene change for said each frame when said second variable divided by said first variable reaches a first predetermined threshold; and
when said scene change is detected for said each frame, each of said at least two of said plurality of processing devices encode remaining video blocks of said each frame by performing only intraframe encoding.

15. The video encoder of claim 14, wherein said plurality of processing devices comprises a plurality of processing cores of a multicore device.

16. The video encoder of claim 14, wherein
said shared memory further stores a third variable comprising a total number of interframe encoded video blocks for said each frame and a fourth variable comprising a total complexity value for said each frame;
wherein each of said at least two of said plurality of processing devices periodically updates said third and fourth variables, and when said at least a first predetermined minimum number of video blocks is encoded for said each frame, further detects a scene change for said each frame when said second variable divided by said first variable reaches a second predetermined threshold which is less than said first predetermined threshold and when said fourth variable divided by said third variable and further divided by a quantization parameter reaches a third predetermined threshold.

17. The video encoder of claim 16, further comprising a plurality of local memories, each coupled to a corresponding one of said plurality of processing devices, and each storing a corresponding one of a plurality of quantization parameters for a slice being encoded by said corresponding processing device.

18. The video encoder of claim 14, further comprising:
a plurality of local memories, each coupled to a corresponding one of said plurality of processing devices, each storing a third variable comprising a total number of encoded video blocks for a current slice being encoded by said corresponding processing device, and each storing a fourth variable comprising a total number of intraframe encoded video blocks for said current slice;
wherein said corresponding processing device periodically updates said third and fourth variables stored in a corresponding local memory while encoding said current slice, and when at least a second predetermined minimum number of video blocks is encoded for said current slice, further detects significant motion for said current slice when said fourth variable divided by said third variable reaches a second predetermined threshold; and
when said significant motion is detected for said current slice, said corresponding processing device encodes remaining video blocks of said current slice by performing only intraframe prediction and intraframe encoding.

19. The video encoder of claim 18, wherein:
each said local memory further storing a fifth variable comprising a total number of interframe encoded video blocks for said current slice and a sixth variable comprising a total complexity value of said current slice; and
wherein said corresponding processing device periodically updates said fifth and sixth variables stored in a corresponding local memory while encoding said current slice, and when at least said second predetermined minimum number of video blocks is encoded for said current slice, further detects significant motion for said current slice when said fourth variable divided by said third variable reaches a third predetermined threshold which is less than said second predetermined threshold and when said sixth variable divided by said fifth variable and further divided by a slice quantization parameter reaches a fourth predetermined threshold.

20. The video encoder of claim 19, wherein each said local memory further stores a corresponding one of a plurality of quantization parameters for said current slice.

* * * * *

UNITED STATES PATENT AND TRADEMARK OFFICE
CERTIFICATE OF CORRECTION

PATENT NO.          : 8,737,475 B2
APPLICATION NO.     : 12/364112
DATED               : May 27, 2014
INVENTOR(S)         : Yan

It is certified that error appears in the above-identified patent and that said Letters Patent is hereby corrected as shown below:

In the Claims

Claim 12, column 17, line 14, should read "to a total number of video blocks that are interframe"

Signed and Sealed this
Twenty-third Day of September, 2014

Michelle K. Lee
*Deputy Director of the United States Patent and Trademark Office*